(12) United States Patent
Anderson (10) Patent No.: US 10,545,464 B2
(45) Date of Patent: Jan. 28, 2020

(54) CONTROL SYSTEM HAVING VARIABLE GAIN FEED FORWARD (VGFF) CONTROL

(71) Applicant: The Boeing Company, Chicago, IL (US)

(72) Inventor: Michael D. Anderson, Brier, WA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 15/366,540

(22) Filed: Dec. 1, 2016

(65) Prior Publication Data

US 2018/0157221 A1    Jun. 7, 2018

(51) Int. Cl.
| | | |
|---|---|---|
| G05B 13/00 | (2006.01) | |
| G05B 13/02 | (2006.01) | |
| G01M 13/00 | (2019.01) | |
| G01M 17/00 | (2006.01) | |

(52) U.S. Cl.
CPC .......... *G05B 13/024* (2013.01); *G01M 17/00* (2013.01); *G05B 2219/37333* (2013.01)

(58) Field of Classification Search
CPC ............... G05B 13/024; G05B 19/406; G05B 2219/37333; G01M 17/00
See application file for complete search history.

(56) References Cited

U.S. PATENT DOCUMENTS

| | | | | |
|---|---|---|---|---|
| 3,699,989 A | * | 10/1972 | O'Connor .............. | G05B 13/04 137/487.5 |
| 5,726,892 A | * | 3/1998 | Tang ..................... | F02P 5/1502 123/339.11 |
| 6,205,863 B1 | * | 3/2001 | Ishii ...................... | G01N 3/10 73/805 |
| 2007/0051184 A1 | * | 3/2007 | Englund ............... | G05B 19/19 73/805 |
| 2008/0221710 A1 | * | 9/2008 | Brunell .................. | G05B 5/01 700/45 |
| 2010/0152868 A1 | * | 6/2010 | Chen ..................... | G05B 11/42 700/42 |
| 2010/0229652 A1 | * | 9/2010 | Jeppesen ................ | G01N 3/08 73/856 |

(Continued)

OTHER PUBLICATIONS

AeroPro™ TM Review Document; "Cross-Coupling Compensation"; MTS Systems Corporation; pp. 1-17 (May 2008).

*Primary Examiner* — Rocio Del Mar Perez-Velez
*Assistant Examiner* — Brian T McMenemy
(74) *Attorney, Agent, or Firm* — Vivacqua Law (57) ABSTRACT

A system for controlling a plurality of actuators is disclosed. The system includes at least one device for operating the plurality of actuators, at least one processor in communication with the device, and a memory coupled the processor. The memory stores data comprising program code that, when executed by the at least one processor, causes the system to receive as input a profile number indicating a specific test being performed by the system and a profile row indicating a load exerted by the plurality of actuators. The system is further caused to select a predetermined gain output based on the profile number and the profile row from a gain array. The gain array is a matrix containing a plurality of gain values, and the predetermined gain output is selected based on the profile number and the profile row. The system is further caused to determine a control value.

18 Claims, 5 Drawing Sheets

(56) References Cited

U.S. PATENT DOCUMENTS

| | | | | |
|---|---|---|---|---|
| 2012/0109464 A1* | 5/2012 | Mizutani | ............ | B60W 10/184 |
| | | | | 701/42 |
| 2015/0283581 A1* | 10/2015 | Jones | ........................ | B07B 1/42 |
| | | | | 209/369 |
| 2016/0334315 A1* | 11/2016 | Leroux | .................... | G01N 3/42 |

* cited by examiner

| CCC Matrix | Actuator 1 (contributing to CCC) | Actuator 2 (contributing to CCC) | Actuator 3 (contributing to CCC) | Actuator 4 (contributing to CCC) | Actuator 5 (contributing to CCC) | Actuator 6 (contributing to CCC) |
|---|---|---|---|---|---|---|
| Actuator 1 (receiving CCC) | Coefficient (1 acting on 1) | Coefficient (2 acting on 1) | Coefficient (3 acting on 1) | Coefficient (4 acting on 1) | Coefficient (5 acting on 1) | Coefficient (6 acting on 1) |
| Actuator 2 (receiving CCC) | Coefficient (1 acting on 2) | Coefficient (2 acting on 2) | Coefficient (3 acting on 2) | Coefficient (4 acting on 2) | Coefficient (5 acting on 2) | Coefficient (6 acting on 2) |
| Actuator 3 (receiving CCC) | Coefficient (1 acting on 3) | Coefficient (2 acting on 3) | Coefficient (3 acting on 3) | Coefficient (4 acting on 3) | Coefficient (5 acting on 3) | Coefficient (6 acting on 3) |
| Actuator 4 (receiving CCC) | Coefficient (1 acting on 4) | Coefficient (2 acting on 4) | Coefficient (3 acting on 4) | Coefficient (4 acting on 4) | Coefficient (5 acting on 4) | Coefficient (6 acting on 4) |
| Actuator 5 (receiving CCC) | Coefficient (1 acting on 5) | Coefficient (2 acting on 5) | Coefficient (3 acting on 5) | Coefficient (4 acting on 5) | Coefficient (5 acting on 5) | Coefficient (6 acting on 5) |
| Actuator 6 (receiving CCC) | Coefficient (1 acting on 6) | Coefficient (2 acting on 6) | Coefficient (3 acting on 6) | Coefficient (4 acting on 6) | Coefficient (5 acting on 6) | Coefficient (6 acting on 6) |

FIG. 3

|   | A | B | B | ... | N |
|---|---|---|---|---|---|
| 1 | Ga1 | ... | Gc1 | ... | Gn1 |
| 2 | Ga2 | ... | Gc2 | ... | Gn2 |
| ... | ... | ... | ... | ... | ... |
| X | GaX | ... | GcX | ... | GnX |

FIG. 5

CONTROL SYSTEM HAVING VARIABLE GAIN FEED FORWARD (VGFF) CONTROL

FIELD

Embodiments of the subject matter described herein relate generally to control systems and methods, and in particular to a method and system for determining a control value based on a variable gain output.

BACKGROUND

Various techniques may be used for testing vehicle systems and components during development and manufacturing. Various durability, lifespan, and performance requirements may be validated by static, quasi-static, and dynamic testing. Specifically, testing techniques that simulate a working environment may be utilized in order to determine whether components and systems perform their intended function during their lifespan. It is to be appreciated that long-term testing techniques may be required to validate components and relatively large systems, and sometimes the long-term testing may become costly.

Actuators are typically utilized when performing long-term or large-scale testing. The actuators may exert force on the systems and/or components being tested. The force exerted upon the components under test is expected to be accurately controlled. Furthermore, the actuators are expected to follow the motion of the component, without imposing uncharacteristic forces or restricting the motion of the component. For example, when testing an airfoil or wing of an aircraft, numerous actuators may be coupled to both the top and bottom sides of the wing. The actuators on the top and bottom side of the wing work in unison to flex the airfoil. Thus, when the wing is flexed in an upward direction, the actuators coupled to the top side of the wing follow the motion and velocity of the wing, without uncharacteristically restricting the movement of the wing while the actuators coupled to a bottom side of the wing are also exerting force in the upward direction.

Dynamic load control involves the accurate application of compressive and tensile forces to a moving object. When the load is exerted on the moving object using hydraulic actuators and servo valves based on classical control methods, sometimes the load may be inaccurate during maximum rated test conditions. Specifically, there may be inaccuracy in the force exerted upon the object relative to a commanded force signal, which is attributed to the motion of the object. As a result, the speed of the moving object may be reduced to obtain the desired force in order to stay within predetermined tolerance boundaries. Decreased speed results in longer test times and increased test expenses, particularly in long-term fatigue testing.

There is a need for reducing testing costs by increasing testing accuracy and, consequently, testing speed. Increasing testing speed of long-term testing may provide substantial reductions in testing expenses. However, attempting to increase the speed at which a test is performed may in turn increase the error as well. Furthermore, a number of testing procedures dictate a threshold error that the system may produce. If the system exceeds the threshold error, then the testing is terminated. The system may be adjusted before the testing may resume, which in turn increases testing time. Thus, there exists a need for a force control system that improves accuracy and also reduces the time required to perform a test.

SUMMARY

In one embodiment, a system for controlling a plurality of actuators is disclosed. The system includes at least one device for operating the plurality of actuators, at least one processor in communication with the device, and a memory coupled the processor. The memory stores data comprising program code that, when executed by the at least one processor, causes the system to receive as input a profile number indicating a specific test being performed by the system and a profile row indicating a load exerted by the plurality of actuators. The system is further caused to select a predetermined gain output based on the profile number and the profile row from a gain array. The gain array is a matrix containing a plurality of gain values, and the predetermined gain output is selected based on the profile number and the profile row. The system is further caused to determine a control value based in part by the predetermined gain output. The control value instructs the at least one device to move the plurality of actuators to a required load.

In another embodiment, a method for controlling a plurality of actuators by a system including at least one device is disclosed. The method comprises receiving as input, by a computer, a profile number indicating a specific test being performed by the system and a profile row indicating a load exerted by the plurality of actuators. The method further includes selecting a predetermined gain output by the computer based on the profile number and the profile row from a gain array. The gain array is a matrix containing a plurality of gain values. The predetermined gain output is selected based on the profile number and the profile row. Finally, the method includes determining, by the computer, a control value based in part by the predetermined gain output. The control value instructs the at least one device to move the plurality of actuators to a required load.

Other objects and advantages of the disclosed method and system will be apparent from the following description, the accompanying drawings and the appended claims.

DETAILED DESCRIPTION

Figure 1:
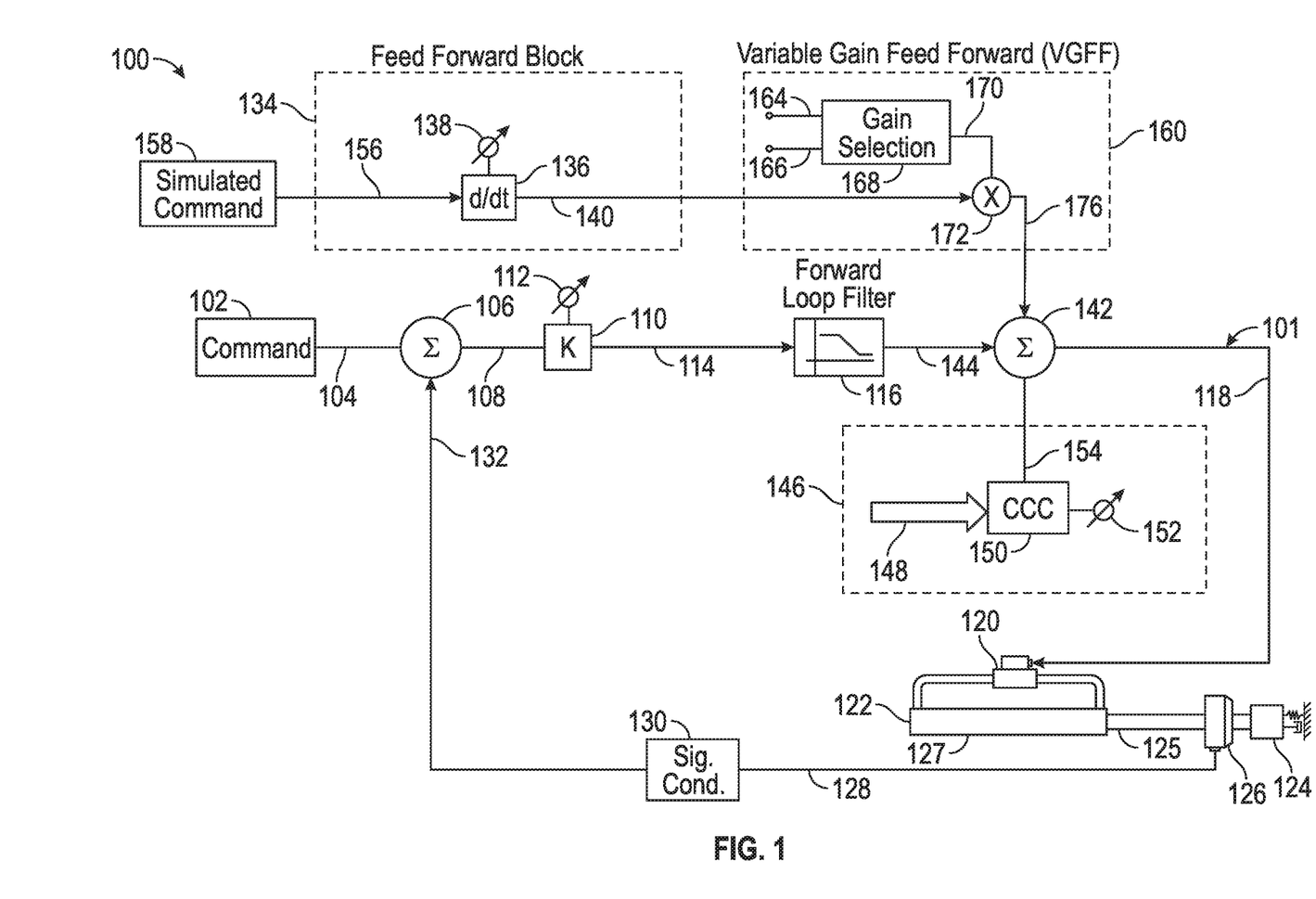
FIG. 1 illustrates a block diagram of an exemplary proportional gain force control system including a variable gain feed forward (VGFF) system, where the proportional gain system controls an actuator.

Referring now to FIG. 1, an exemplary block diagram of the disclosed proportional gain force control system 100 is shown. The force control system 100 illustrated in FIG. 1 is a proportional-integral-differential (PID) system. It is to be appreciated for purposes of clarity and simplicity, only a proportional loop 101 of the PID system is illustrated in FIG. 1. However, those of ordinary skill in the art will readily appreciate that the disclosed proportional gain force control system 100 also includes an integral loop as well as a differential loop. The force control system 100 may be used for dynamic testing of a component or system, such as a test object 124. Some examples of the testing of the test object 124 include cyclic testing and fatigue testing. The force control system 100 may include a command controller 102 and an actuator 122 for exerting force upon the test object 124. It is to be understood that a single actuator 122 is illustrated in FIG. 1 for purposes of simplicity and clarity, as the force control system 100 may be used for multi-actuator systems. As explained in greater detail below, the actuator 122 shown in FIG. 1 may be controlled based on a command signal 104 generated by the command controller 102.

Figure 2:
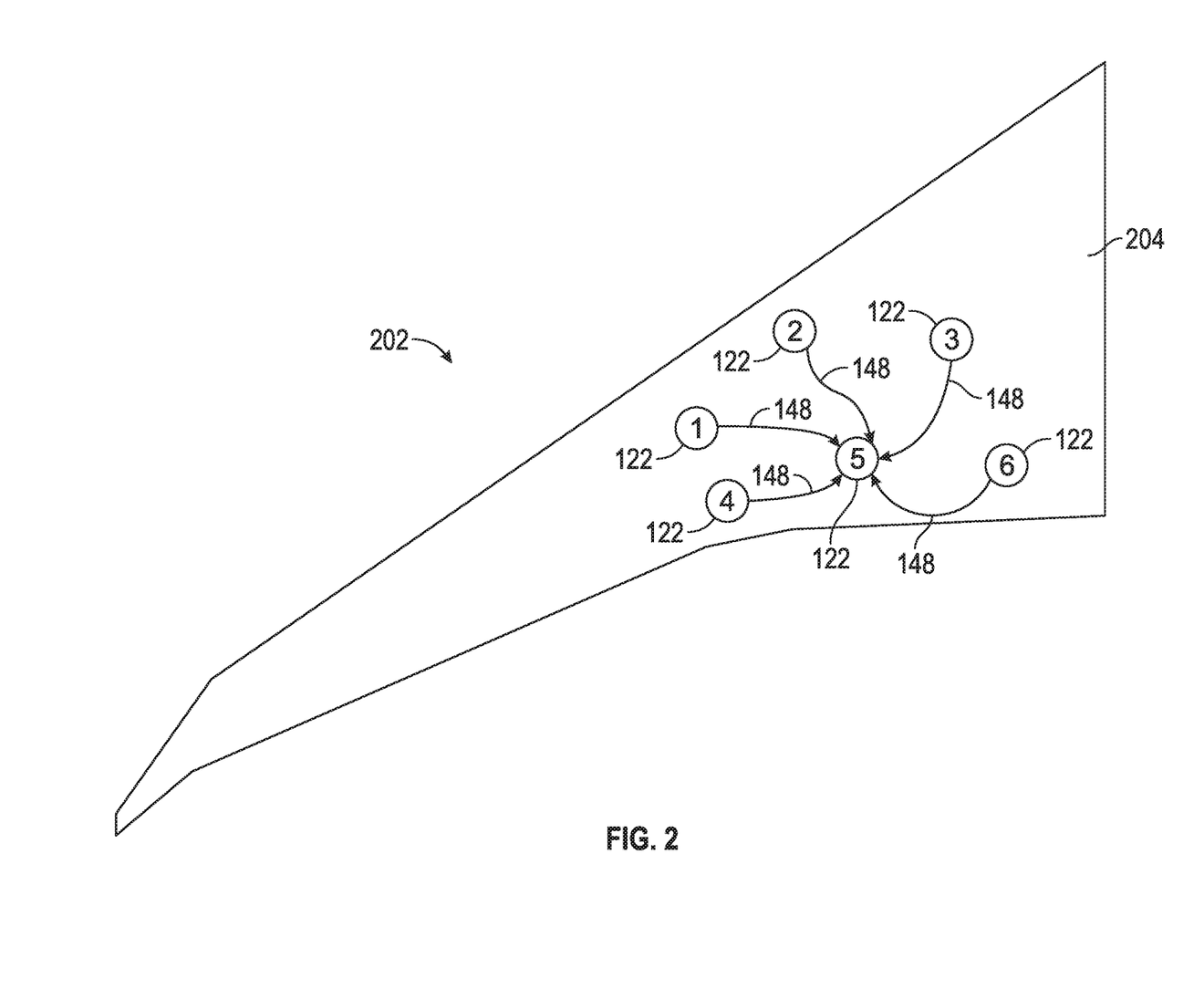
FIG. 2 is a top view of an exemplary aircraft wing, where multiple actuators act upon the wing.

The test object 124 may be any type of object used in dynamic testing procedures such as, for example, an airfoil, a door, or a body panel of an aircraft. FIG. 2 illustrates the test object 124 as a wing 202 for an aircraft, where a plurality of actuators 122 exert force upon the wing 202. While the present disclosure describes testing aircraft components, the force control system 100 is not limited to testing only aircraft components. Indeed, the force control system 100 may be used for testing a variety of applications and components such as, but not limited to, a land-based vehicle systems, applications that require servicing of a vehicle, or any system with interacting multi-actuator systems acting upon a single test object.

Turning back to FIG. 1, the force control system 100 may include the command controller 102, a summing junction 106, a proportional gain or gain adjustment block 110, a forward loop filter 116, at least one servo valve 120, a signal conditioning block 130, a feed forward block 134, a cross coupling compensation (CCC) block 146, and a variable gain feed forward (VGFF) block 160. As explained below, the VGFF block 160 may provide increased accuracy and decreased time associated with performing a specific test by the force control system 100. It is to be appreciated that VGFF-based control may sometimes utilize a particular phenomenon associated with multi-actuator systems. Specifically, multi-actuator systems generate a fundamental error signal having a profile similar or substantially identical to a feed-forward signal, regardless of the number of actuators included within a system.

The command controller 102, the summing junction 106, the gain adjustment block 110, the forward loop filter 116, the signal conditioning block 130, the feed forward block 134, the (CCC) block 146, and the VGFF block 160 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the command controller 102, the summing junction 106, the gain adjustment block 110, the forward loop filter 116, the signal conditioning block 130, the feed forward block 134, the (CCC) block 146, and the VGFF block 160 may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

As seen in FIG. 1, the command controller 102 may generate the command signal 104. The command signal 104 may indicate a selected measurement of the actuator 122, as well as a required rate of change of the measurement of the actuator 122. The selected measurement may represent, for example, a required load that the actuator 122 exerts.

The actuator 122 may simulate various operating conditions upon the test object 124 and/or perform various durability, performance, lifespan, and other testing procedures. The actuator 122 may be any component capable of exerting force upon the test object 124. For example, in the embodiment as shown in FIG. 1 the actuator 122 is a hydraulic actuator including an actuator rod 125 and a piston (not shown) that may travel within a cylinder 127. The position and the rate of change of the position of the piston (not shown) within the actuator rod 125 of the actuator 122 may be adjusted by the servo valve 120. Specifically, the servo valve 120 controls the flow of hydraulic fluid to and from the actuator 122. Those of ordinary skill in the art will readily appreciate although a servo valve is described, the servo valve 120 may be any other device that controls the position and the rate of change of the position of the piston (not shown) within the actuator rod 125 of the actuator 122 may be used as well.

A force transducer 126 may be coupled between the test object 124 and the hydraulic actuator 122. The force transducer 126 may convert the force exerted upon the test object 124 by the actuator 122 into an electrical signal 128. The signal conditioning block 130 may receive the electrical signal 128 from the force transducer 126, and convert the electrical signal 128 into engineering units of load. The signal conditioning block 130 may generate a feedback load signal 132 based on the electrical signal 128 received from the force transducer 126. It is to be appreciated that the feedback load signal 132 may include high frequency component generated by the actuator 122. For example, in one embodiment, a hydraulic actuator may transmit oscillating loads detectable by the force transducer 126 anywhere from about 5 Hertz to about 50 Hertz.

The feedback load signal 132 from the signal conditioning block 130 and the command signal 104 from the command controller 102 may be combined together at the summing junction 106, thereby resulting in an error value 108. Those of ordinary skill in the art readily appreciate that proportional gain load control systems such as the force control system 100 shown in FIG. 1 generate error. One goal may be to produce an error signal that is about zero, or is as close to zero as possible. Those of ordinary skill in the art may also appreciate that reducing error when oscillating an object, such as in a fatigue application, may result in a reduction of total testing time. Moreover, reducing the error within the force control system 100 may also result in an increase of the frequency of the command signal 104, which also reduces the total testing time. The error value 108 takes into account any discrepancies within the force control system 100 and the higher frequency components of the feedback load signal 132.

The error value 108 may be received by the gain adjustment block 110. As seen in FIG. 1, the gain adjustment block 110 includes a gain adjustment value 112. The gain adjustment block 110 may be located between the summing junction 106 and the forward loop filter 116. The proportional gain or gain adjustment block 110 may multiply the error value 108 by the gain adjustment value 112 in order to determine an output value 114. The output 114 of the gain adjustment block 110 may be sent to the forward loop filter 116.

In one non-limiting embodiment, the forward loop filter 116 is a low pass filter that attenuates higher frequency load components, which thereby enhances the stability of the force control system 100. Specifically, the forward loop filter 116 may be used to attenuate the high frequency components of the feedback load signal 132. An output 144 of forward loop filter 116 may be sent to a summing junction 142. A control value 118 may be determined based on the output 144 of the forward loop filter 116, a CCC output 154, and a VGFF output signal 176, which is explained below. In one embodiment, the control value 118 may be a current signal that instructs the servo valve 120 to change the position and the rate of change of the position of the piston (not shown) within the actuator rod 125 of the actuator 122 based on the command signal 104. The control value 118 may follow the command signal 104, however there may be a delay between the command signal 104 and the control value 118, which contributes to the error value 108.

Continuing to refer to FIG. 1, the feed forward block 134 may include a derivative signal processing block 136 that receives a simulated command signal 156 from a command simulator 158. The simulated command signal 156 may represent a test control channel that is not used to control the actuator 122. The simulated command signal 156 may toggle between two known unique values in order to ensure a feed forward signal 140 is always generated. In one embodiment, both the unique values may be integers, such as the numbers 1 and 2. The two known unique values may be arbitrary, but not random. The derivative signal processing block 136 may determine the derivative of the simulated command signal 156. The derivative of the simulated command signal 156 may then be adjusted by a feed forward gain value 138, which results in the feed forward signal 140. It is to be appreciated that the feed forward signal 140 is an analog value. Specifically, in one embodiment the simulated command signal 156 is a sinusoidal input, and the feed forward signal 140 may be an analog signal having a bell-shaped profile. In another example, the simulated command signal 156 is a ramp, and the feed forward signal 140 is the slope of the ramp, or a constant value.

Although FIG. 1 illustrates the feed forward block 134 determining the derivative of the simulated command signal 156, it is to be appreciated that the disclosure is not limited to this particular embodiment. For example, in another approach the feed forward block 134 may determine the derivative of the command signal 104 in order to determine the feed forward signal 140.

FIG. 2 is an exemplary illustration of a plurality of actuators 122 disposed along an upper surface 204 of the wing 202. For purposes of simplicity and clarity, only six actuators are illustrated disposed along a portion of the wing 202. The actuators 122 are numbered from 1-6, where actuators 1-4 and 6 surround actuator 5. Although six actuators 122 are illustrated, it is to be appreciated that any number of actuators 122 may be disposed along the upper surface 204 of the wing 202. Furthermore, the actuators 122 may also be situated along a bottom surface (not visible in FIG. 2) of the wing 202 as well.

With reference to FIGS. 1 and 2, it is to be appreciated that changing load on any particular actuator 122 disposed along the wing 202 may affect the operation of the remaining actuators 122 situated adjacent to the particular actuator 122 experiencing the change in load. Accordingly, the CCC block 146 of the force control system 100 may add contributive feed forward signals from each of the actuators 122. The CCC block 146 may allow for multiple actuators 122, which may be moving in different directions or speeds, to communicate with one another. The contributive feed forward signals allow for a moving actuator 122 to communicate its movement to the remaining actuators 122 situated along the wing 202. Additionally, contributive feed forward signals also allow for the moving actuator 122 to coordinate movement with the remaining actuators 122, thereby reducing resultant load errors. Indeed, if load is changed on any actuator 122, this may affect the loads of the adjacent actuators 122.

In the embodiment as shown in FIG. 2, actuators 1-4 and 6 communicate their respective movements to actuator 5. Referring to both FIGS. 1 and 2, the respective movements of the actuators 1-4 and 6 upon actuator 5, as well as the force generated by actuator 5 itself, may be represented by a multi-actuator feed forward input 148. As seen in FIG. 1, the multi-actuator feed forward input 148 may be received by a CCC matrix block 150. The values of the multi-actuator feed forward input 148 may be multiplied by the CCC matrix block 150, and each of the values may be summed together in order to generate the CCC output 154. The CCC matrix block 150 represents a matrix of fixed gains of each of the actuators 122 included within the system (i.e., actuators 1-6 seen in FIG. 2). The fixed gains of each actuator 122 may be referred to as coefficients. The feed forward input 148 may be compensated using a single gain multiplier 152 at the CCC matrix block 150. It is to be appreciated that the single gain multiplier 152 applies to each coefficient in the CCC matrix block 150. The CCC matrix block 150 may produce a singular CCC output 154. The single gain multiplier 152 is described in greater detail below. The singular CCC output 154 may be sent to the summing junction 142.

Figure 3:
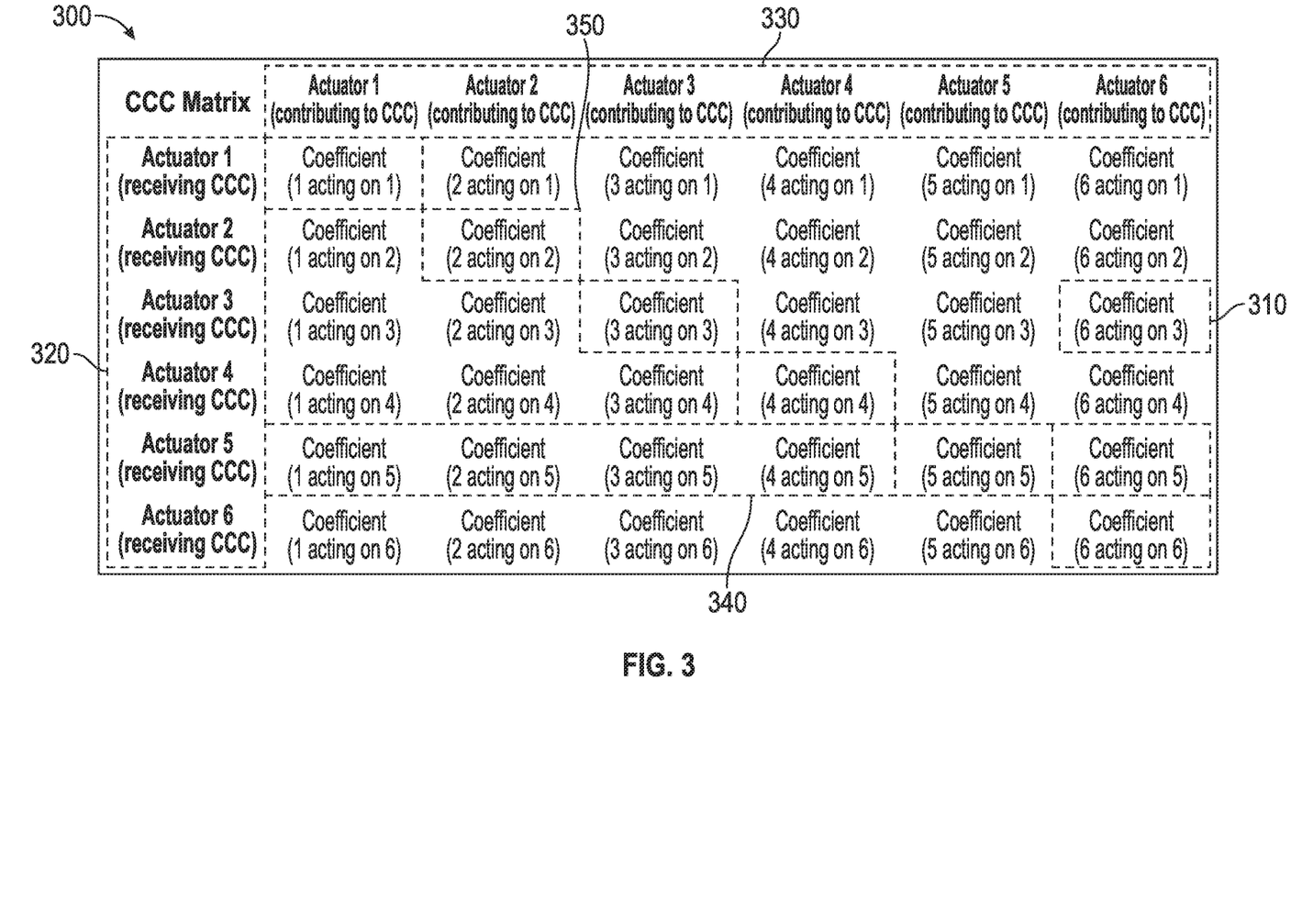
FIG. 3 is an exemplary cross coupling compensation (CCC) table based on operation of the actuators shown in FIG. 2.

FIG. 3 is an exemplary CCC matrix 300 that may be utilized by the CCC matrix block 150 in FIG. 1. In the exemplary embodiment as shown, the matrix 300 is generated by operation of the actuators 1-6 illustrated in FIG. 2, which creates a 6×6 matrix of coefficients 310 and thirty-six individual coefficients 310. Each coefficient 310 represents the force of one of the actuators 122 acting either upon another actuator 122, or itself. It is to be appreciated that the coefficients 310 may be expressed as numerical values, however FIG. 3 simply lists a description for each coefficient 310. The matrix 300 also includes row headers 320 and column headers 330. The row headers 320 designate the specific actuator 122 that receives a compensation value, and the column headers 330 designate the specific actuator 122 that makes the feed forward contribution via the compensation value. The sum of the coefficients 310 of a single row 340 of the matrix 300 represent the total load experienced by each particular actuator 122 (e.g., in FIG. 3 the total load by actuator 5). Furthermore, a central diagonal component 350 of the matrix 300 defines the force of one of the actuators 122 acting upon itself. It is to be appreciated that the matrix 300 may reduce the error value 108.

Referring now to both FIGS. 1 and 3, the single gain multiplier 152 may be applied to the sum of the individual coefficients 310 of each row 320. The single gain multiplier 152 may be a fixed value. In one embodiment, an initialization procedure may be performed on each of the actuators 1-6 in order to determine the initial values for the coefficients 310 of the matrix 300. It is to be appreciated that the values of the coefficients 310 may be modified during testing. If the values of the coefficients 310 for one particular actuator 122 are adjusted in order to decrease error, then the error associated with other load transitions for that particular actuator 122 may also increase. This is because the single gain multiplier 152 represents an overall gain value. The load transition may represent a change in force exerted by each of the actuators 122 (FIG. 2), individually or cumulatively, within the force control system 100 as at least one of the actuators 122 change position.

Referring to FIG. 1, the VGFF block 160 may include a gain array 168 and a multiplier 172. As explained in greater detail below and shown in FIGS. 4A-4B, VGFF control requires only a single gain value to generate an output signal, which is illustrated in FIG. 1 as the VGFF output signal 176. In the embodiment as illustrated, the gain array 168 may receive two inputs, namely a profile number 164 and a profile row 166, which are both explained in greater detail below. In one exemplary embodiment, the profile number input 164 may be a three-bit number and the profile row 166 may be a twelve-bit number.

Figure 5:
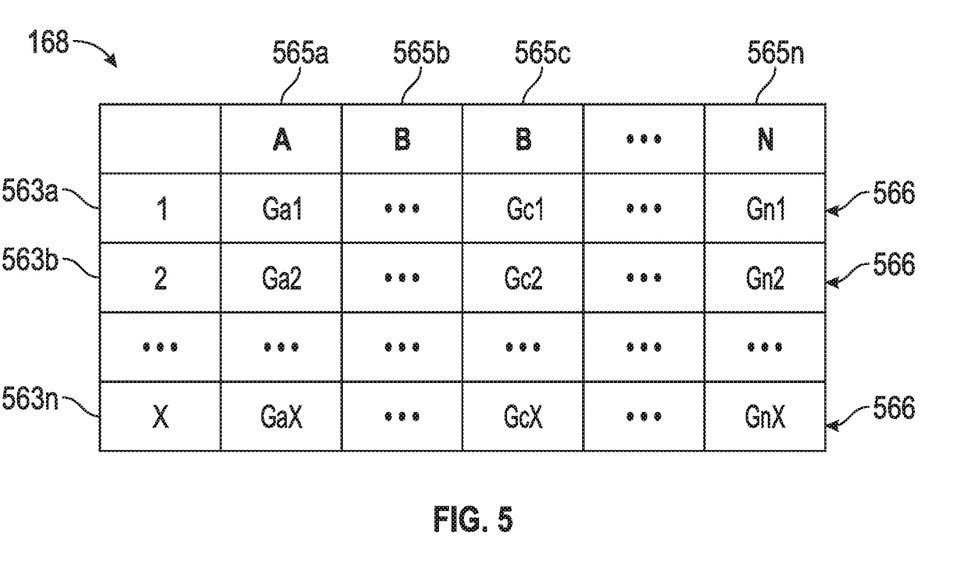
FIG. 5 is an exemplary variable gain matrix.

Referring now to FIG. 5, an exemplary gain array 168. In the embodiment as illustrated, the gain array 168 may include a plurality of rows 563a-563n and a plurality of columns 565a-565n, where n may represent any number. Each row 563a-563n may represent a load exerted by the actuators 122 (FIG. 2) during various test procedures. It is to be appreciated that each row 563a-563n may represent unique values. Each column 565a-565n may represent a unique test procedure. Although FIG. 5 illustrates the gain array 168 having four rows and five columns, it is to be appreciated that the illustration is merely exemplary in nature and the gain array 168 may be of any size. Indeed, those of ordinary skill in the art will readily appreciate that the gain array 168 shown in FIG. 5 is used for simplicity and ease of explanation. For example, in one embodiment the A test procedure listed in column 565a may include over two thousand different rows, which translates into over two thousand unique load values.

Each row 563a-563n may represent a unique load exerted by the actuators 122. For example, in one embodiment row A may represent a load of about 500 kilograms (about 1102 pounds), row B may represent a load of about 1000 kilograms (about 2204 pounds), and row C may represent a load of about 1500 kilograms (about 3306 pounds). Those of ordinary skill in the art will readily appreciate that these examples are merely illustrative in nature, and that the gain array 168 may include any number of different loads. The gain array 168 may include 2,597 different rows. In one embodiment the profile row 166 (FIG. 1) represents a twelve-bit number, since a twelve-bit number may represent any value up to 4,096.

Continuing to refer to FIG. 5, each column 565a-565n represents a profile number. The profile number may represent a specific test being performed by the force control system 100. For example, in one embodiment, if the testing is performed for an automotive application, profile number A may simulate highway driving conditions, profile number B may simulate city traffic conditions, and profile C may simulate rough road conditions. It is to be appreciated that this embodiment is merely exemplary in nature, and that the profile numbers may represent any type of test the force control system 100 is capable of performing. Moreover, in an embodiment where aircraft testing is performed, each column 565a-565n may represent a flight number. The flight number may simulate a particular flight of an aircraft. For example, flight number A may simulate a relatively long overseas flight, while flight number C may represent a relatively short flight between two cities spaced about 400 kilometers (about 250 miles) apart. The profile number 164 (FIG. 1) represents the various profile numbers 565a-565n. For example, if five unique profile numbers are included within the gain array 168, then the profile number 164 represents a three-bit number, since a three-bit value is required to express five profile numbers.

The gain array 168 may be a matrix containing a plurality of gain values 566, where each gain value 566 represents the gain produced based on a specific profile number (i.e., a particular test) at a specific profile row (i.e., a particular test). For example, the gain value Ga1 is produced by executing a test based on profile number A at the load represented by row 1. Similarly, the gain value Gb2 is produced by executing a test based on profile number B at the load represented by row 2. The gain values 566 may be determined by an initialization procedure or survey that is performed before the actual test is performed by the force control system 100. The survey performs each test listed in columns 565a-565n of the gain array 168 at the load listed in the rows 563a-563n, where the resulting gain values 566 are added to the gain array 168.

Referring to FIGS. 1 and 5, during testing the gain array 168 may receive as input the profile number 164 indicating the specific test being performed and the profile row 166 indicating the load exerted by the actuators 122. The VGFF block 160 may then select one of the gain values 566 based on the input. For example, if the profile number 164 indicates the C test and the profile row 166 indicates load 2, then the gain value Gc2 is selected. The selected gain value may be referred to as the gain output 170. This, the gain output 170 is a predetermined value selected from the gain array 168.

The gain output 170 may be sent to the multiplier 172. The multiplier 172 may multiply the feed forward output 170 with the feed forward signal 140, resulting in the VGFF output signal 176. The VGFF output signal 176 may be sent to the summing junction 142. The summing junction 142 combines the VGFF output signal 176, the output 144 of forward loop filter 116, and the singular CCC output 154 (if applicable) together, which results in the control value 118.

Figure 4A:
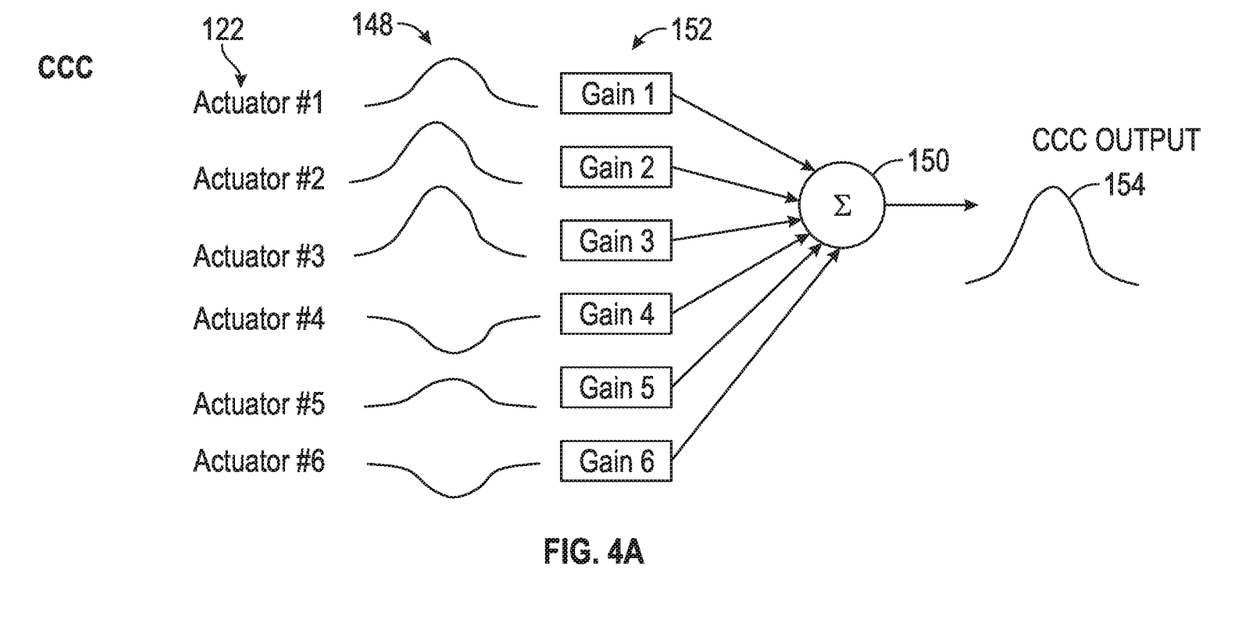
FIG. 4A is a graphical representation of a CCC compensation signal created by the actuators shown in FIG. 2.

FIG. 4A is an illustration of an exemplary approach to determine the CCC output 154 (FIG. 1) based on multiple inputs created by each of the actuators 1-6 illustrated in FIG. 2. Specifically, each actuator 122 generates its own unique feed forward input 148. As seen in FIG. 4A, each feed forward input 148 includes its own profile. For example, actuators 1-3 and 5 include a positive amplitude, and actuators 4 and 6 include a negative amplitude. Each feed forward input 148 is received by the CCC matrix 150. The CCC matrix 150 may combine each of the feed forward inputs 148 together in order to generate the CCC output 154.

Figure 4B:
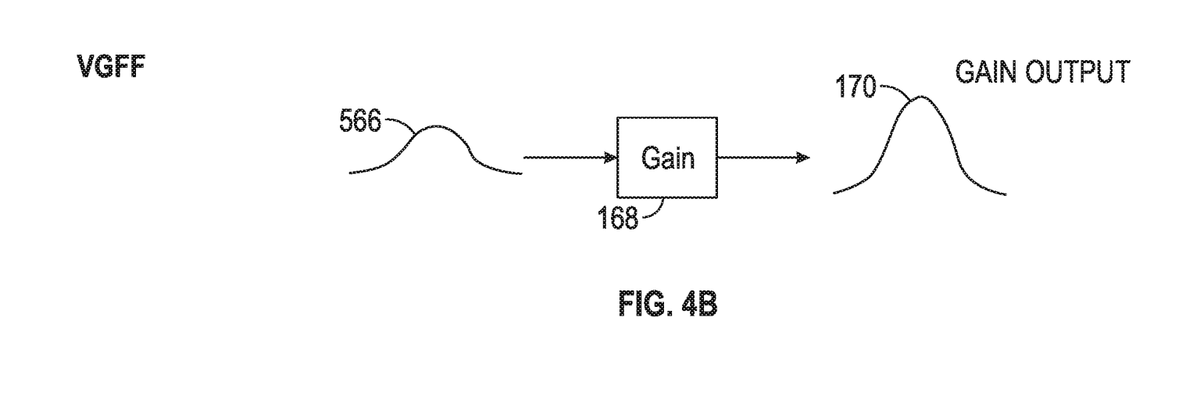
FIG. 4B illustrates a graphical representation of a feed forward signal multiplied by a variable gain output created by the actuators shown in FIG. 2 based on VGFF control.

FIG. 4B is an illustration of an exemplary approach to calculate the gain output 170 based on a single input which represents operation of actuators 1-6 in FIG. 2. Specifically, the single input is one of the gain values 566 shown in FIG. 5. Referring to FIGS. 1, 4B, and 5, a specific gain value 566 may be selected from the gain array 168. The selected gain value 566 is the gain output 170. As demonstrated in FIGS. 4A and 4B, utilizing VGFF-based control may result in greater simplicity when determining a feed forward input value, since only a single gain value is considered. This simplicity may allow test operators to efficiently determine test values and settings. Moreover, if an observed actuator 122 generates a particular error 108 based on a selected gain value from the gain array 168, then a user may simply increase or decrease the gain value in the gain array 168 for a particular row 563 and a particular column 565 in order to reduce the error 108.

Referring generally to the figures, technical effects and benefits of the disclosed force control system 100 may include simplicity, reduced error, and a reduction in time required to perform a test. Indeed, VGFF-based control requires determining only a single variable gain value, which results in enhanced simplicity. Moreover, reducing error within the force control system may result in a reduction of the total time required to perform a particular test. In one example, utilizing the disclosed VGFF block may reduce the time required to perform a structural fatigue test for an aircraft by two to six months. The structural fatigue test typically takes about three years to complete without VGFF-based control, and may sometimes take up to five years to complete in some instances.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A system (100) for controlling a plurality of actuators (122), the system (100) comprising:
   at least one device (120) for operating the plurality of actuators (122);
   at least one processor in communication with the at least one device (120);
   and a memory coupled to the at least one processor, the memory storing data comprising program code that, when executed by the at least one processor, causes the system (100) to:
   perform an initialization procedure to determine a plurality of gain values (566) in a gain array (168), wherein each of the plurality of gain values (566) represent a gain produced by performing a specific test at a unique load exerted by the plurality of actuators (122);
   receive as input a profile number (164) indicating the specific test being performed by the system (100) and a profile row (166) indicating the unique load exerted by the plurality of actuators (122);
   select a predetermined gain output (170) from the gain array (168), wherein the predetermined gain output (170) is selected based on the profile number (164) wherein the gain array (168) is a matrix containing the plurality of gain values (566), and
   determine a control value (118) based in part on the predetermined gain output (170), and a feed forward signal (140), wherein the control value (118) instructs the at least one device (120) to move the plurality of actuators (122) to a required load.

2. The system (100) of claim 1, wherein the control value (118) is based in part on the feed forward signal (140).

3. The system (100) of claim 1, wherein the system is caused to generate a feedback load signal (132) based on a force exerted by the plurality of actuators (122).

4. The system (100) of claim 3, wherein the system (100) determines an error value (108) based on the feedback load signal (132) and a command signal (104), and wherein the command signal (104) indicates the required load of the plurality of actuators (122).

5. The system (100) of claim 4, wherein the control value (118) is based in part on the error value (108).

6. The system (100) of claim 1, wherein a multi-actuator feed forward input (148) is generated by the plurality of actuators (122).

7. The system (100) of claim 6, wherein the control value (118) is based in part by a cross coupling compensation (CCC) output (154), and wherein the CCC output (154) is determined based on the multi-actuator feed forward input (148) and a single gain multiplier (152).

8. The system (100) of claim 1, wherein the at least one device (120) is a servo valve and the control value (118) is a current signal.

9. The system of claim 1, wherein the system is caused to generate a simulated command signal (156) that is substantially equal to a command signal (104) indicating the required load of the plurality of actuators (122).

10. The system (100) of claim 9, wherein the feed forward signal (140) is a derivative of the simulated command signal (156), and wherein the simulated command signal (156) toggles between two known values.

11. The system of claim 9, wherein the system is caused to determine a feed forward signal (140) based in part on the simulated command signal (156), wherein the feed forward signal (140) comprises a derivative of the simulated command signal (156).

12. A method for controlling a plurality of actuators (122) by a system (100) including at least one device (120), the method comprising:
   performing an initialization procedure to determine a plurality of gain values (566) in a gain array (168), wherein each of the plurality of gain values (566) represent a gain produced by performing a specific test at a unique load exerted by the plurality of actuators (122);
   receiving as input, by a computer, a profile number (164) indicating the specific test being performed by the system (100) and a profile row (166) indicating the unique load exerted by the plurality of actuators (122);
   selecting a predetermined gain output (170) from the gain array (168), wherein the predetermined gain output (170) is selected by the computer based on the profile number (164) and the profile row (166) from a gain array (168), wherein the gain array (168) is a matrix containing the plurality of gain values (566), and wherein the predetermined gain output (170) is selected based on the profile number (164) and the profile row (166); and
   determining, by the computer, a control value (118) based in part by the predetermined gain output (170) and a feed forward signal (140), wherein the control value (118) instructs the at least one device (120) to move the plurality of actuators (122) to a required load.

13. The method of claim 12, wherein the control value (118) is based in part on the feed forward signal (140).

14. The method of claim 12, comprising generating a feedback load signal (132) based on a force exerted by the plurality of actuators (122).

15. The method of claim 14, comprising determining an error value (108) based on the feedback load signal (132) and a command signal (104), and wherein the command signal (104) indicates the required load of the plurality of actuators (122).

16. The method of claim 12, comprising generating by the computer a simulated command signal (156) that is substantially equal to a command signal (104) indicating the required load of the plurality of actuators (122).

17. The method of claim 16, wherein the feed forward signal (140) is a derivative of the simulated command signal (156), and wherein the simulated command signal (156) toggles between two known values.

18. The method of claim 16, comprising determining a feed forward signal (140) by the computer based in part on the simulated command signal (156), wherein the feed forward signal (140) comprises a derivative of the simulated command signal (156).

* * * * *